(12) United States Patent
Chen et al.

(10) Patent No.: US 7,640,279 B2
(45) Date of Patent: Dec. 29, 2009

(54) APPARATUS AND METHOD FOR FILE-LEVEL REPLICATION BETWEEN TWO OR MORE NON-SYMMETRIC STORAGE SITES

(75) Inventors: Ying Chen, San Jose, CA (US);
Kenneth F. Day, III, Tucson, AZ (US);
Philip M. Doatmas, Tucson, AZ (US);
David A. Pease, Redwood Estates, CA (US); John J. Wolfgang, Winston-Salem, NC (US)

(73) Assignee: International Business Machines Corporation, Armonk, NY (US)

( * ) Notice: Subject to any disclaimer, the term of this patent is extended or adjusted under 35 U.S.C. 154(b) by 438 days.

(21) Appl. No.: 11/291,629

(22) Filed: Nov. 30, 2005

(65) Prior Publication Data

US 2007/0124340 A1   May 31, 2007

(51) Int. Cl.
*G06F 12/00* (2006.01)
*G06F 17/30* (2006.01)

(52) U.S. Cl. ...................................... 707/204; 711/165
(58) Field of Classification Search .................... 707/1; 711/165
See application file for complete search history.

(56) References Cited

U.S. PATENT DOCUMENTS

| 6,904,503 B2 * | 6/2005 | Urabe et al. ................. 711/162 |
| 7,076,620 B2 * | 7/2006 | Takeda et al. ................ 711/161 |
| 2003/0182313 A1 * | 9/2003 | Federwisch et al. ......... 707/200 |
| 2003/0182330 A1 * | 9/2003 | Manley et al. .............. 707/205 |
| 2004/0039756 A1 | 2/2004 | Bromley |
| 2004/0260970 A1 | 12/2004 | Beardsley et al. |
| 2005/0038968 A1 * | 2/2005 | Iwamura et al. ............. 711/162 |
| 2005/0055523 A1 * | 3/2005 | Suishu et al. ................ 711/165 |
| 2005/0097260 A1 * | 5/2005 | McGovern et al. .......... 711/100 |
| 2005/0144202 A1 * | 6/2005 | Chen .......................... 707/205 |

OTHER PUBLICATIONS

Ghemawat, "The Google File System", ACM, Oct. 19-22, 2003, pp. 29-43.
Choy, "Disaster Recovery Techniques for Database Systems", ACM, 2000, pp. 272-280.
Levy, "Distributed File Systems: Concepts and Examples", ACM Computing Surveys, Dec. 1990, vol. 22, No. 4, pp. 321-374.
Hurley et al., "File Migration and File Replication: A Symbiotic Relationship", 1996 IEEE, pp. 578-586.

* cited by examiner

*Primary Examiner*—Hosain T Alam
*Assistant Examiner*—Azam Cheema
(74) *Attorney, Agent, or Firm*—Dale F. Regelman; Quarles & Brady LLP (57) ABSTRACT

An apparatus and method to replicate one or more files between non-symmetric storage systems are disclosed. The method supplies a first storage system comprising a first configuration, a first volume, a first file system, and a first replication appliance comprising first replication appliance memory. The method further supplies a second storage system comprising a second configuration, a second volume, a second file system, and a second replication appliance comprising second replication appliance memory, where the first configuration differs from the second configuration. The first storage system receives a dataset, writes that dataset to the first volume as a first file. Applicants' method then replicates the first file to the second volume as a second file, and maintains in the second replication appliance memory a second replication appliance mapping associating the first file with the second file.

13 Claims, 6 Drawing Sheets

APPARATUS AND METHOD FOR FILE-LEVEL REPLICATION BETWEEN TWO OR MORE NON-SYMMETRIC STORAGE SITES

FIELD OF THE INVENTION

This invention relates to an apparatus and method for file-level replication between two or more non-symmetric storage sites. In certain embodiments, the invention relates to copying files from a first storage area network file system to a second storage area network file system.

BACKGROUND OF THE INVENTION

Data storage subsystems are used to store information provided by one or more host computer systems. Such data storage subsystems receive requests to write information to one or more data storage devices, and requests to retrieve information from those one or more data storage devices.

Having a backup data copy is mandatory for many businesses for which data loss would be catastrophic. Primary data stored in a first data storage system is periodically backed-up by replicating that data to a second data storage system. Using prior art replication methods, however, the first data storage system and the second data storage system must have identical hardware and/or logical configurations.

What is needed is an apparatus and method to replicate files between non-symmetric storage systems, i.e. between data storage system comprising differing hardware and/or logical configurations.

SUMMARY OF THE INVENTION

Applicants' invention comprises a method to replicate one or more files between non-symmetric storage systems. The method supplies a first storage system comprising a first hardware configuration, a first volume, a first file system, and a first replication appliance comprising first replication appliance memory. The method further supplies a second storage system comprising a second hardware configuration, a second volume, a second file system, and a second replication appliance comprising second replication appliance memory, where the first hardware configuration differs from the second hardware configuration.

Applicants' first storage system receives a dataset, writes that dataset to the first volume as a first file. Applicants' method then replicates the first file to the second volume as a second file, and maintains in the second replication appliance memory a second replication appliance mapping associating the first file with the second file.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

Figure 1:
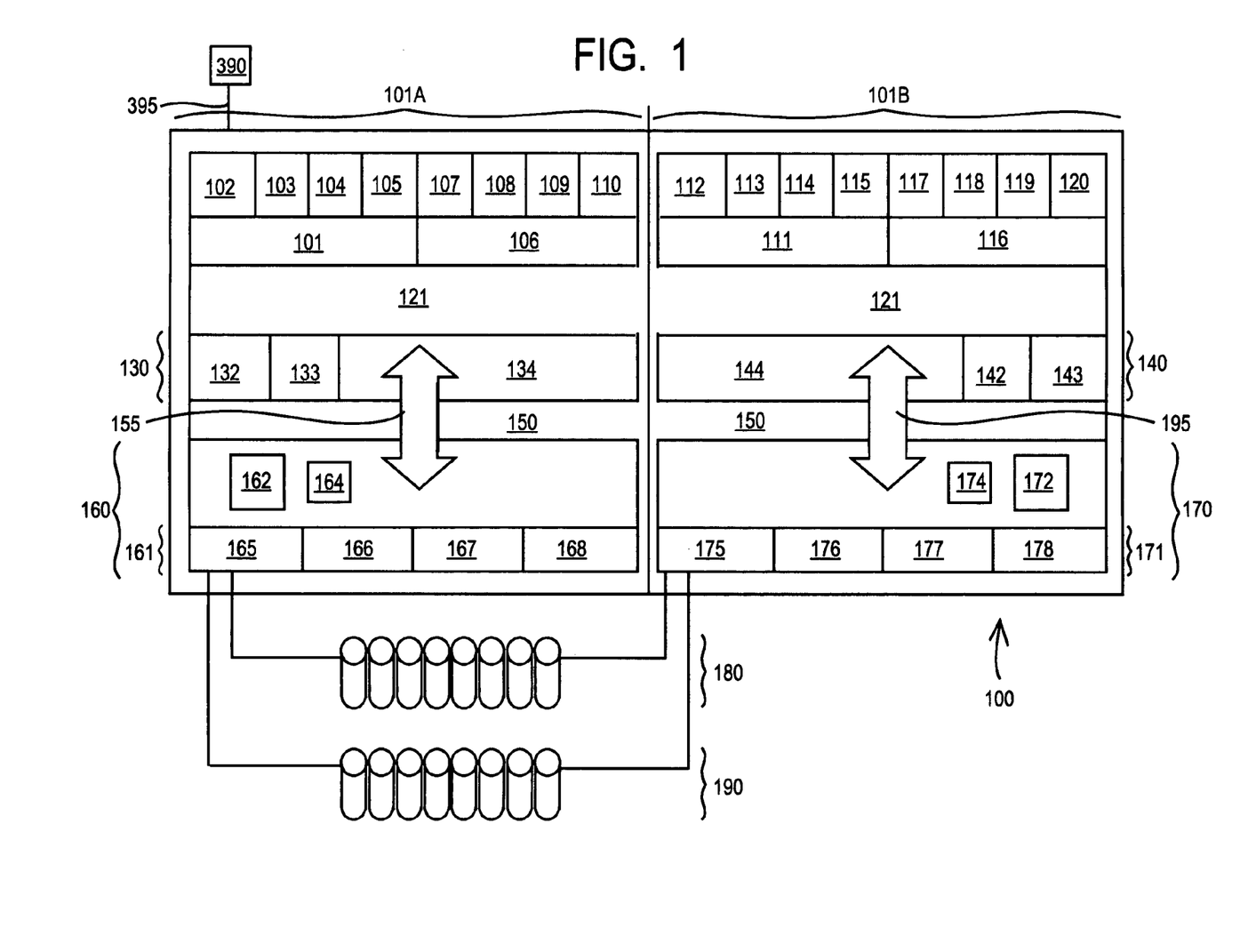
FIG. 1 is a block diagram showing one embodiment of Applicants' data storage system.

This invention is described in preferred embodiments in the following description with reference to the Figures, in which like numbers represent the same or similar elements. Referring now to FIG. 1, data storage system 100 is capable of communication with host computer 390 via communication link 395. The illustrated embodiment of FIG. 1 shows a single host computer. In other embodiments, Applicants' data storage system is capable of communicating with a plurality of host computers.

Host computer 390 comprises a computer system, such as a mainframe, personal computer, workstation, and combinations thereof, including an operating system such as Windows, AIX, Unix, MVS, LINUX, etc. (Windows is a registered trademark of Microsoft Corporation; AIX is a registered trademark and MVS is a trademark of IBM Corporation; UNIX is a registered trademark in the United States and other countries licensed exclusively through The Open Group; and LINUX is a registered trademark of Linus Torvald). In certain embodiments, host computer 390 further includes a storage management program. The storage management program in the host computer 390 may include the functionality of storage management type programs known in the art that manage the transfer of data to and from a data storage and retrieval system, such as the IBM DFSMS implemented in the IBM MVS operating system.

In certain embodiments, Applicants' data storage system includes a plurality of host adapters. In the illustrated embodiment of FIG. 1, system 100 comprises host adapters 102-105, 107-110, 112-115 and 117-120. In other embodiments, Applicants' data storage system includes fewer than 16 host adapters. In still other embodiments, Applicants' data storage system includes more than 16 host adapters. In certain embodiments, one or more of the host adapters are multi-ported. Regardless of the number of host adapters disposed in any embodiments of Applicants' system, each of those host adapters comprises a shared resource that has equal access to both central processing/cache elements 130 and 140.

Each host adapter may comprise one or more Fibre Channel ports, one or more FICON ports, one or more ESCON ports, or one or more SCSI ports, and the like. Each host adapter is connected to both clusters through interconnect bus 121 such that each cluster can handle I/O from any host adapter. Internal buses in each subsystem are connected via a Remote I/O bridge 155/195 between the processor portions 130/140 and I/O portions 160/170, respectively.

Processor portion 130 includes processor 132 and cache 134. In certain embodiments, processor portion 130 further includes memory 133. In certain embodiments, memory device 133 comprises random access memory. In certain embodiments, memory device 133 comprises non-volatile memory.

Processor portion 140 includes processor 142 and cache 144. In certain embodiments, processor portion 140 further includes memory 143. In certain embodiments, memory device 143 comprises random access memory. In certain embodiments, memory device 143 comprises non-volatile memory.

I/O portion 160 comprises a plurality of device adapters 161 which in the illustrated embodiment of FIG. 1 comprises device adapters 165, 166, 167, and 168. I/O portion 160 further comprise nonvolatile storage ("NVS") 162 and battery backup 164 for NVS 162.

I/O portion 170 comprises a plurality of device adapters 171 which in the illustrated embodiment of FIG. 1 comprises device adapters 175, 176, 177, and 178. I/O portion 170 further comprises nonvolatile storage ("NVS") 172 and battery backup 174 for NVS 172.

In certain embodiments of Applicants' system, one or more host adapters, processor portion 130, and one or more device adapters are disposed on a first control card disposed in Applicants' data storage system. Similarly, in certain embodiments, one or more host adapters, processor portion 140, one or more device adapters are disposed on a second control card disposed in Applicants' data storage system.

In the illustrated embodiment of FIG. 1, sixteen data storage devices are organized into two arrays, namely array 180 and array 190. The illustrated embodiment of FIG. 1 shows two storage device arrays.

In certain embodiments, one or more of the data storage devices comprise a plurality of hard disk drive units. In certain embodiments, arrays 180 and 190 utilize a RAID protocol. In certain embodiments, arrays 180 and 190 comprise what is sometimes called a JBOD array, i.e. "Just a Bunch Of Disks" where the array is not configured according to RAID. In certain embodiments, arrays 180 and 190 comprise what is sometimes called an SBOD array, i.e. "Switched Bunch Of Disks".

The illustrated embodiment of FIG. 1 shows two storage device arrays. In other embodiments, Applicants' system includes a single storage device array. In yet other embodiments, Applicants' system includes more than two storage device arrays.

Figure 2:
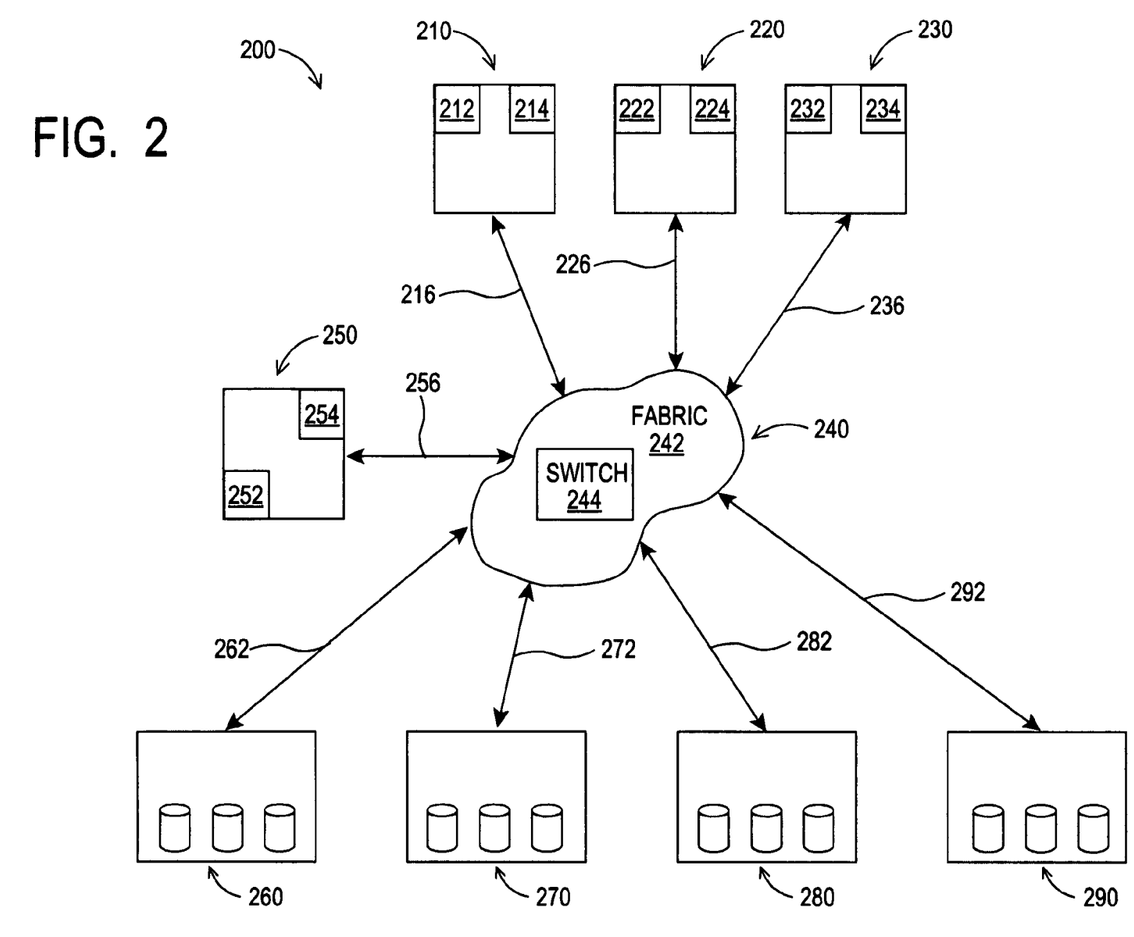
FIG. 2 is a block diagram showing one embodiment of Applicants' storage area network.

FIG. 2 is a block diagram that illustrates one embodiment of Applicants' storage area network ("SAN") 200. In the illustrated embodiment of FIG. 2, SAN 200 comprises a switched-access-network, wherein switches 244 are used to create a switching fabric 242. In certain embodiments, SAN 200 is implemented using Small Computer Systems Interface (SCSI) protocol running over a Fibre Channel ("FC") physical layer. In other embodiments, SAN 200 utilizes other protocols, such as without limitation, Infiniband, FICON, TCP/IP, Ethernet, Gigabit Ethernet, or iSCSI. The switches 244 have the addresses of servers 210, 220, and 230, metadata server 250, and Network Attached Storage (NAS) comprising data storage systems 260, 270, 280, and 290. In certain embodiments, one or more of data storage systems 260, 270, 280, and/or 290, comprise data storage system 100 (FIG. 1).

Servers 210, 220, and 230, are connected to the fabric 242 by communication links 216, 226, and 236, respectively. Communication links 216, 226, and 236, may comprise any type of communication link, including without limitation, a FC arbitrated loop, a direct attachment to fabric 242, or one or more signal lines used by servers 210, 220, and/or 230, to transfer information respectively to and from fabric 242. Fabric 242 comprises, for example, one or more FC switches 244 used to connect two or more computer networks.

In certain embodiments, servers 210, 220, and/or 230, comprise host computers. As a general matter, servers 110, 120, and 130 each comprise a computer system, such as a mainframe, personal computer, workstation, and combinations thereof, including operating systems 212, 222, and 232, respectively. Operating systems 212, 222, and/or 232 may be the same, or one or more of those operating systems may differ. As a general matter, operating systems 212, 222, and/or 232, are each independently selected from the group consisting of Windows, AIX, UNIX, MVS, LINUX, and the like. (Windows is a registered trademark of Microsoft Corporation; AIX is a registered trademark of, and MVS is a trademark of, the IBM Corporation; UNIX is a registered trademark in the United States and other countries licensed exclusively through The Open Group; and LINUX is a registered trademark of Linus Torvald).

Switches 244 interconnect servers to storage libraries 260, 270, and 280, across communication links 262, 272, and 282, respectively. Communication links 262, 272, and 282, comprise any one or more types of known interfaces, for example, Fibre Channel, Infiniband, Gigabit Ethernet, Ethernet, TCP/IP, iSCSI, SCSI Communication link, or one or more signal lines used by FC switches 144.

In the illustrated embodiment of FIG. 2, SAN 240 is interconnected to three data storage libraries. In other embodiments, Applicants' SAN is interconnected to fewer than three data storage libraries. In still other embodiments, Applicants' SAN is interconnected to more than three data storage libraries. In the illustrated embodiment of FIG. 2, each data storage library comprises three data storage devices. In other embodiments, one or more of Applicants' data storage libraries comprises fewer than three data storage devices. In still other embodiments, one or more of Applicants' data storage libraries comprises more than three data storage devices.

Metadata server 250 is interconnected with fabric 242 by communication link 256. Communication link 256 may comprise any type of Communication link; for example, a FC arbitrated loop, a direct attachment to fabric 66, or one or more signal lines used by metadata server 250, to transfer information to and from fabric 242. Metadata server 250 comprises a set of data storage management policies 252 and processor 254.

Unlike technology based on common file-sharing protocols such as CIFS (Common Internet File System) and NFS (Network File System), in certain embodiments Applicants' SAN 200 utilizes Fibre Channel as its storage connection. In certain embodiments, Applicants' data storage system 200 utilizes a SAN file system ("SFS"). With CIFS and NFS, data access is bottle necked at the file server or NAS (network-attached storage) head level. With a SAN file system, in contrast, data flows freely from the storage unit to the servers.

Applicants' SFS is designed to provide a single point of control for managing files and databases. Applicants' SFS enables policy-based file provisioning, distributed file locking and file-based copy services to help automate and speed information-sharing and management tasks.

As those skilled in the art will appreciate, a SFS comprises two primary components. Each server, i.e. host computer, comprises a portion of the SFS that is specifically designed for its operating system. For example servers 210, 220, and 230, comprise SAN file system elements 214, 224, and 234, respectively. Servers 210, 220, and 230, are sometimes referred to as a "client" for SAN file system purposes.

Applicants' SFS further utilizes metadata server 250 which serves as a traffic controller and resource allocator "clients," such as servers 210, 220, and 230. Metadata server 250 restricts client access to storage resources, but once access is granted, the clients are free to communicate directly with the storage resources. Data storage management policies 252 define, inter alia, access rights and copy services defined for the various files comprising Applicants' SFS. Clients must obtain authorization from metadata server 150 for operations that must be coordinated across the SAN, such as for example creating, writing, opening, closing, and/or replicating a file.

Applicants' invention comprises an apparatus and method to replicate files from a first storage system comprising a first hardware configuration and a first file system to a second storage system comprising a second hardware configuration and a second file system. Using prior art methods, replicating files from a first storage system to a second storage system requires an identity in both hardware, i.e. physical, configurations and logical configurations between the two systems. Applicants' apparatus and method, however, allows replicating files from a first storage system to a second storage system wherein the physical and/or logical configuration of the first system differs from the physical and/or logical configuration of the second system.

Figure 3:
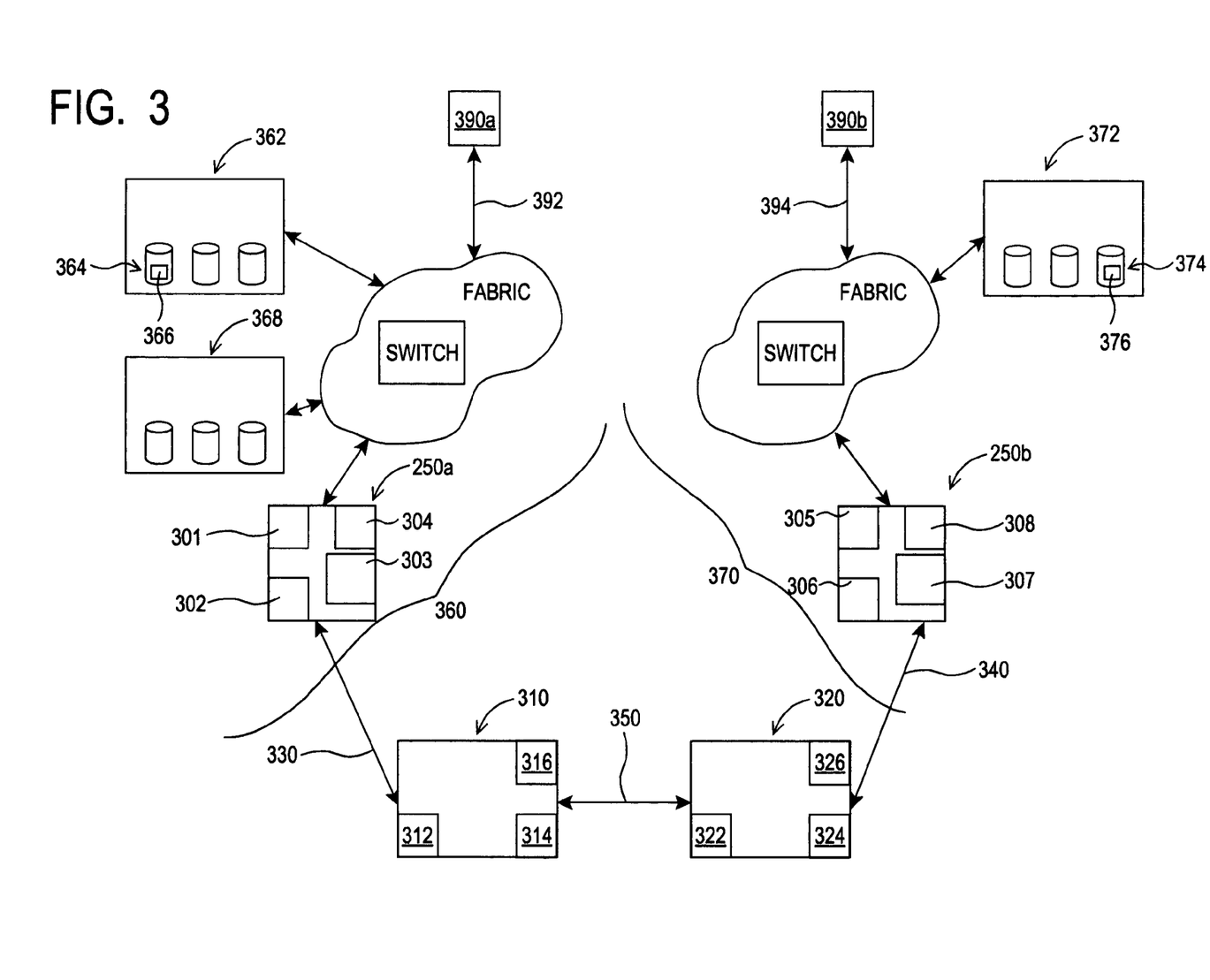
FIG. 3 is a block diagram showing one embodiment of Applicants' data processing system which comprises two non-symmetric data storage systems.

Referring now to FIG. 3, data processing system 300 comprises a first storage system 360 and a second storage system 370, wherein systems 360 and 370 comprise differing hardware configurations. Storage system 360 comprises storage library 362 and storage library 364. Storage system 370 comprises storage library 372.

Storage system 360 is interconnected with host computer 390a via communication link 392. Storage system 360 comprises metadata server 250a. Metadata server 250a comprises first file system 301, data storage management policies 302, processor 303, and instructions 304.

Storage system 370 is interconnected with host computer 390b via communication link 396. Storage system 370 comprises metadata server 250b. Metadata server 250b comprises second file system 305, data storage management policies 306, processor 307, and instructions 308.

Replication appliance 310 is interconnected with metadata server 250a via communication link 330. Replication appliance 310 is interconnected with replication appliance 320 via communication link 350. Replication appliance 320 is interconnected with metadata server 250b via communication link 340. Communication links 330, 340, 350, 395, and 396, each comprise any one or more types of known interfaces, for example, Fibre Channel, Infiniband, Gigabit Ethernet, Ethernet, TCP/IP, iSCSI, SCSI Communication link, and the like.

Figure 4:
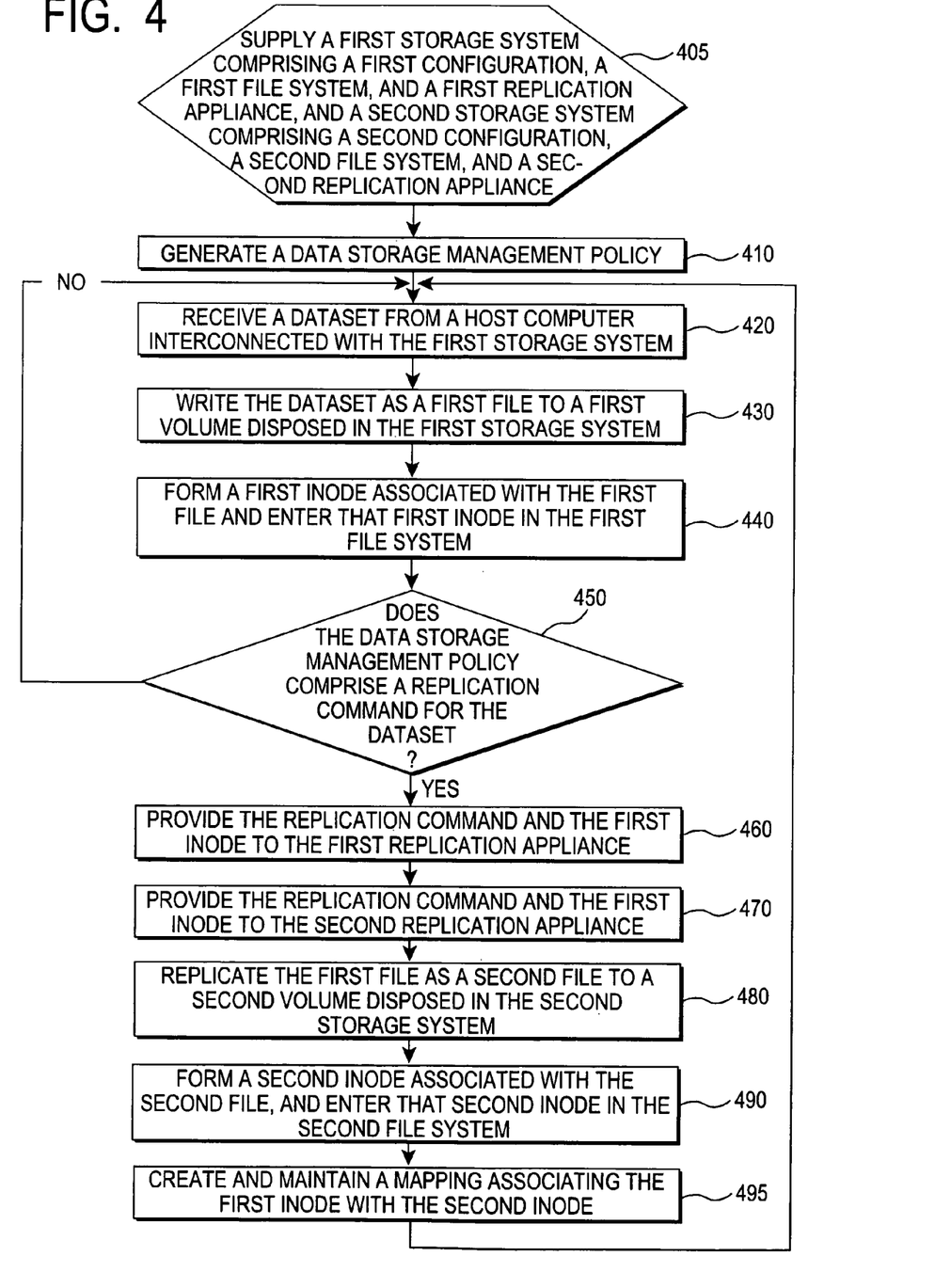
FIG. 4 is a flow chart summarizing the steps of Applicants' method to replicate files between non-symmetric storage systems.

Applicants' invention comprises a method to replicate files between non-symmetric storage systems, such as systems 360 and 370, using Applicants' apparatus. Referring now to FIG. 4, in step 405 Applicants' method supplies a first storage system comprising a first configuration, a first file system, and a first replication appliance, such as replication appliance 310 (FIG. 3). Step 405 further comprises supplying a second storage system comprising a second configuration, a second file system, and a second replication appliance, such as replication appliance 320 (FIG. 3).

In certain embodiments, the first storage system comprises data storage system 100. In certain embodiments, the first storage system comprises a SAN, such as for example SAN 200. In certain embodiments, the second storage system comprises data storage system 100. In certain embodiments, the second storage system comprises a SAN, such as for example SAN 200. In certain embodiments, the first file system comprises a SAN file system. In certain embodiments, the second file system comprises a SAN file system.

In certain embodiments, the first storage system and/or the second storage system is owned and/or operated by a data storage services provider providing data storage services to one or more data storage customers. In certain of these data storage services provider embodiments, one or more host computers owned and/or operated by one or more data storage services customers are in communication with the first storage system and/or the second storage system.

In step 410, Applicants' method forms a data storage management policy, such as data storage management policy 308 (FIG. 3), wherein that data storage management policy comprises, inter alia, one or more replication methods to replicate files between the first storage system and the second storage system. By "replication method," Applicants mean a command to perform any known method to copy files from one or more first volumes to one or more second volumes, wherein the one or more first volumes comprise physical volumes and/or logical volumes, and wherein the one or more second volumes comprise physical and/or logical volumes.

In certain embodiments, a storage services customer creates, and then provides the data storage management policy of step 410 to a data storage services provider. In certain embodiments, Applicants' first storage system further comprises a first metadata server, such as metadata server 250a. In certain embodiments, step 410 further comprises storing the data storage management policy in the first metadata server.

In certain embodiments, the one or more replication methods comprise one or more copy relationships selected from the group consisting of a peer-to-peer copy relationship, a peer-to-peer remote copy relationship, a peer-to-peer remote copy extended distance relationship, an extended remote copy relationship, a FlashCopy relationship, and a concurrent copy relationship. IBM publication entitled IBM TotalStorage Enterprise Storage Server Implementing ESS Copy Services with IBM eServer zSeries, September 2003, describes the above-recited copy relationships, and is hereby incorporated herein by reference.

In step 420, the first data storage system receives a dataset from a host computer. In step 430, Applicants' method writes that dataset as a first file, such as first file 366 (FIG. 3) to a first volume disposed in Applicants' first file system. In certain embodiments, the first volume of step 430 comprises a physical volume, such as volume 364 (FIG. 3). In certain embodiments, the first volume of step 430 comprises a logical volume.

Applicants' method transitions from step 430 to step 440 wherein the method forms a first inode associated with the first file of step 430. As those skilled in the art will appreciate, an inode comprises a data structure comprising information about a file. As a general matter, inodes comprise information such as file name, file address, user and group ownership, access mode (read, write, execute permissions), and type. Step 440 further comprises entering the first inode in the first file system, such as first file system 302 (FIG. 3). In certain embodiments, step 440 is performed by the metadata server, such as metadata server 250a, disposed in Applicants' first storage system.

Applicants' method transitions from step 440 to step 450, wherein the method determines if the data management policy of step 410 comprises a replication command for the dataset of step 420. In certain embodiments, step 440 is performed by a metadata server, such as metadata server 250a, disposed in Applicants' first storage system.

If Applicants' method determines in step 450, that the data management policy of step 410 does not comprise a replication command for the dataset of step 420, then the method transitions from step 450 to step 420 and continues as described herein. Alternatively, if Applicants' method determines in step 450, that the data management policy of step 410 does comprise a replication command for the dataset of step 420, then the method transitions from step 450 to step 460 wherein Applicants' method provides the replication command identified in step 450, and the first inode formed in step 440, to the first replication appliance. In certain embodiments, steps 460 is performed by a metadata server, such as for example metadata server 250*a* (FIG. 3), disposed in Applicants' first storage system, such as for example storage system 360 (FIG. 3).

Applicants' method transitions from step 460 to 470 wherein Applicants' method provides the replication command identified in step 450, and the first inode formed in step 440, to a replication appliance, such as for example replication appliance 320 (FIG. 3), disposed in Applicants' second storage system, such as for example system 370 (FIG. 3).

Applicants' method transitions from step 470 to step 480 wherein Applicants' method replicates, using the replication command, the first file of step 430 to a second volume, such as second volume 374, as a second file, such as second file 376. In certain embodiments, step 480 is performed by a second replication appliance, such as replication appliance 250*b*, disposed in Applicants' second storage system, such as for example storage system 370.

Applicants' method transitions from step 480 to step 490 wherein Applicants' method forms a second inode associated with the second file of step 480, and enters that second inode in the second file system, such as second file system 305. In certain embodiments, step 490 is performed by a replication appliance, such as replication appliance 250*b*, disposed in Applicants' second storage system, such as for example storage system 370.

Applicants' method transitions from step 490 to step 495 wherein the method creates and maintains a second replication appliance mapping, such as mapping 326, wherein that second replication appliance mapping associates the first inode with the second inode. In certain embodiments, the second replication mapping comprises a database. In certain embodiments, the second replication mapping comprises a lookup table. In certain embodiments, step 495 further comprises providing the second inode by the second replication appliance to the first replication appliance, wherein the first replication appliance maintains a first replication appliance mapping, and wherein the first replication appliance associates the second inode with the first inode in the first replication appliance mapping.

In certain embodiments, step 495 is performed by a replication appliance disposed in Applicants' second storage system. Applicants' method transitions from step 495 to step 420 and continues as described herein.

Figure 5:
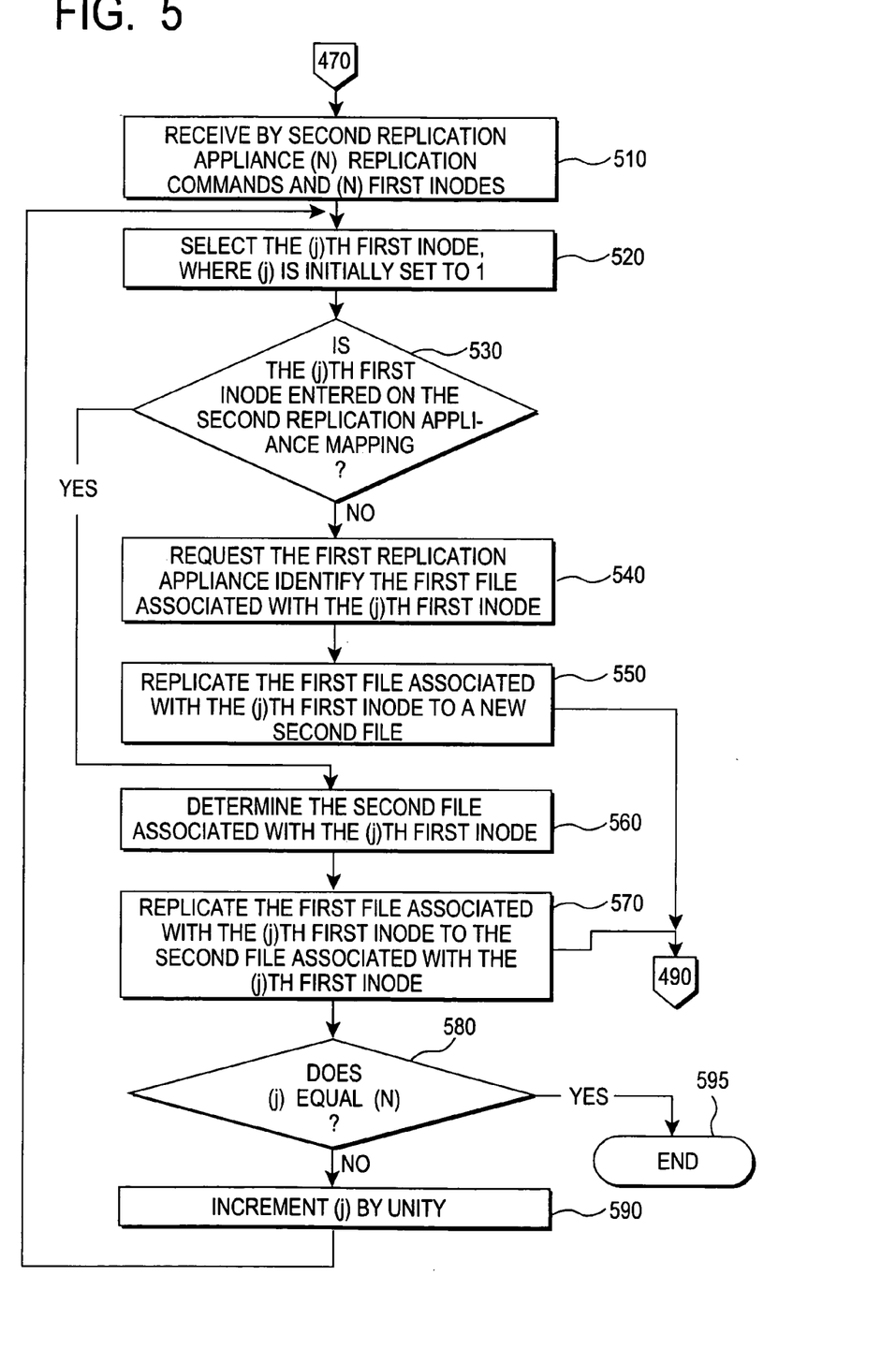
FIG. 5 is a flow chart summarizing certain additional steps in Applicants' method.

In certain embodiments, steps 470 and 480 comprises the steps recited in FIG. 5. Referring now to FIG. 5, in step 510 a replication appliance in Applicants' second storage system receives (N) replication commands and (N) first inodes, wherein (N) is greater than 0. In step 520, the replication appliance of step 510 selects the (j)th replication command and (j)th inode, wherein (j) is greater than or equal to 1 and less than or equal to (N), and wherein (j) is initially set to 1.

In step 530, Applicants' second replication appliance determines if the first file associated with (j)th first inode comprises a new file, or comprises an update to an existing file. In certain embodiments, step 530 comprises determining by the second replication appliance if the (j)th first inode is entered on the second replication appliance mapping. If Applicants' second replication appliance determines in step 530 that the (j)th first inode is not entered on the second replication appliance mapping, then the method transitions from step 530 to step 540 wherein the second replication appliance queries the first replication appliance for the name of the first file associated with the (j)th first inode. Applicants' method transitions from step 540 to step 550 wherein the second replication appliance replicates the first file associated with the (j)th first inode as a new second file, and saves that new second file to a volume, logical and/or physical, disposed in Applicants' second storage system. Applicants' method transitions from step 550 to step 490 (FIG. 4), wherein the method forms a second inode associated with the new second file of step 550, and enters that second inode in the second file system. Applicants' method also transitions from step 550 to step 580, and continues as described herein.

If Applicants' second replication appliance determines in step 530 that the (j)th first inode is entered on the second replication appliance mapping, then the method transitions from step 530 to step 560 wherein the second replication appliance determines, using the second replication appliance mapping, the first file associated with (j)th first inode. In step 570, Applicants' second replication appliance replicates the first file associated with the (j)th first inode to the second file already associated with the (j)th first inode. Applicants' method transitions from step 570 to step 420 (FIG. 4), and to step 580, and continues as described herein.

In step 580, Applicants' method determines if each of the (N) replication commands of step 510 have been implemented, i.e. determines if (j) equals (N). In certain embodiments, step 580 is performed by Applicants' second replication appliance. If Applicants' method determines in step 580 that each of the (N) replication commands of step 510 have been implemented, then the method transitions from step 580 to step 595 and the embodiment of Applicants' method recited in FIG. 5 ends.

Alternatively if Applicants' method determines in step 580 that each of the (N) replication commands of step 510 have not been implemented, then the method transitions from step 580 to step 590 wherein the method increments (j) by unity. In certain embodiments, step 590 is performed by Applicants' second replication appliance. Applicants' method transitions from step 590 to step 520 and continues as described herein.

Figure 6:
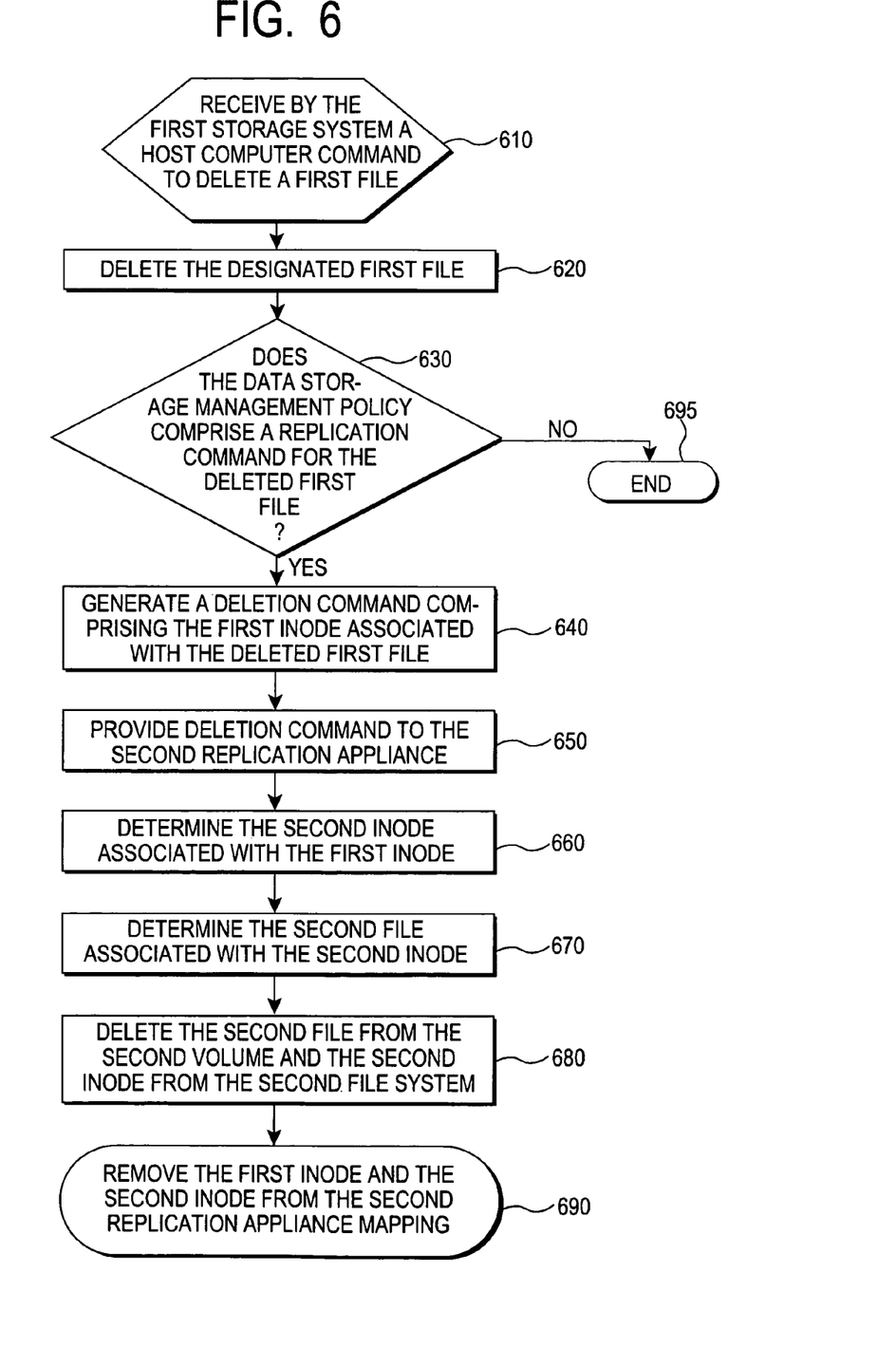
FIG. 6 is a flow chart summarizing certain additional steps in Applicants' method.

Applicants' method comprises an embodiment to delete replicated files. Referring now to FIG. 6, in step 610 Applicants' first storage system receives a command to delete a designated first file written to a first volume disposed in the first storage system. In certain embodiments, a host computer in communication with Applicants' first storage system provides the deletion command of step 610.

Applicants' method transitions from step 610 to step 620 wherein the method deletes the designated first file. In certain embodiments, step 620 is performed by a metadata server disposed in the first storage system.

Applicants' method transitions from step 620 to step 630 wherein the method determines if the data storage management policy comprises a replication command for the deleted first file. In certain embodiments, step 630 is performed by a metadata server disposed in Applicants' first storage system.

If Applicants' method determines in step 630 that the data storage management policy does not comprise a replication command for the deleted first file, then the method transitions from step 630 to step 695 and ends. Alternatively, if Applicants' method determines in step 630 that the data storage management policy does comprise a replication command for the deleted first file, then the method transitions from step 630 to step 640 wherein the method generates a deletion command comprising the first inode associated with the deleted file. In certain embodiments, step 640 is performed by a metadata server disposed in Applicants' first storage system.

Applicants' method transitions from step 640 to step 650 wherein the method provides the deletion command of step 640, and the first inode associated with the deleted first file, to a second replication appliance disposed in Applicants' second storage system. In certain embodiments, step 650 is performed by a metadata server disposed in Applicants' first storage system. In certain embodiments, step 650 further comprises providing the deletion command of step 640, and the first inode associated with the deleted first file, to a first replication appliance disposed in Applicants' first storage system, and then providing by the first replication appliance the deletion command, and the first inode associated with the deleted first file, to the interconnected second replication appliance.

Applicants' method transitions from step 650 to step 660 wherein Applicants' second replication appliance determines, using the second replication appliance mapping, the second inode associated with the first inode. Applicants' method transitions from step 660 to step 670 wherein the second replication appliance determines the second file associated with the second inode. Applicants' method transitions from step 670 to step 680 wherein the second replication appliance deletes from a volume, logical and/or physical, disposed in the second storage system the second file of step 670.

Applicants' method transitions from step 680 to step 690 wherein the method removes the first inode and the second inode from the second replication appliance mapping. In certain embodiments, step 690 further comprises removing the first inode and the second inode from a first replication appliance mapping disposed in the first replication appliance.

In certain embodiments, individual steps recited in FIGS. 4, 5, and/or 6, may be combined, eliminated, or reordered.

In certain embodiments, Applicants' invention includes instructions, such as instructions 304 (FIG. 3), and/or 308 (FIG. 3), and/or 314 (FIG. 3), and/or 324, where those instructions are executed by a processor, such as processor 303 (FIG. 3), 307 (FIG. 3), 312 (FIG. 3) and/or 322 (FIG. 3), respectively, to perform one or more of steps 420, 430, 440, 450, 460, 470, 480, 490, and/or 495, recited in FIG. 4, and/or steps 510, 520, 530, 540, 550, 560, 570, 580, and/or 590, recited in FIG. 5, and/or steps 610, 620, 630, 640, 650, 660, 670, 680, and/or 690, recited in FIG. 6.

In other embodiments, Applicants' invention includes instructions residing in any other computer program product, where those instructions are executed by a computer external to system 100, to perform one or more of steps of steps 420, 430, 440, 450, 460, 470, 480, 490, and/or 495, recited in FIG. 4, and/or steps 510, 520, 530, 540, 550, 560, 570, 580, and/or 590, recited in FIG. 5, and/or steps 610, 620, 630, 640, 650, 660, 670, 680, and/or 690, recited in FIG. 6.

In either case, the instructions may be encoded in an information storage medium comprising, for example, a magnetic information storage medium, an optical information storage medium, an electronic information storage medium, and the like. By "electronic storage media," Applicants mean, for example, a device such as a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to replicate one or more files between non-symmetric storage systems, comprising the step of:

supplying a first storage system comprising a first metadata server, a first configuration, a first volume, a first file system;

supplying a first replication appliance comprising first replication appliance memory, wherein said first replication appliance is external to but in communication with said first storage system;

supplying a second storage system comprising a second configuration, a second volume, a second file system;

supplying a second replication appliance comprising second replication appliance memory, wherein said second replication appliance is external to but in communication with said second storage system, and wherein said first replication appliance is external to but in communication with said second replication appliance;

wherein said first configuration differs from said second configuration;

providing a dataset to said first storage system;

writing said dataset to said first volume as a first file;

generating by said first metadata server a first inode for said dataset;

providing said first inode to said second replication appliance;

replicating said first file to said second volume as a second file;

generating by said second replication appliance a second inode for said second file;

maintaining in said second replication appliance memory a second replication appliance mapping, wherein said second replication mapping associates said first file with said second file.

2. The method of claim 1, wherein:

said first storage system comprises a first storage area network ("SAN");

said first file system comprises a first SAN file system;

said second storage system comprises a second SAN; and said second file system comprises a second SAN file system.

3. The method of claim 1, wherein said supplying a first storage system step further comprises supplying a first storage system comprising a first metadata server comprising first metadata server memory, said method further comprising the steps of:

forming a data storage management policy;

writing said data storage management policy to said first metadata server memory;

determining by said first metadata server if said data storage management policy comprises a replication command to replicate said dataset to said second storage system;

operative if said data storage management policy comprises a command to replicate said dataset to said second storage system, providing said replication command to said second replication appliance.

4. The method of claim 3, further comprising the steps of:

receiving by said second replication appliance said replication command;

implementing by said second replication appliance said replication command.

5. The method of claim 4, wherein said replication command is selected from the group consisting of a synchronous PPRC command, an asynchronous PPRC command, a Flash-Copy command, an XRC copy command, and a Concurrent Copy command.

6. The method of claim 1, further comprising the steps of:

maintaining in said second replication appliance a second replication appliance mapping associating said first inode with said second inode.

7. The method of claim 6, further comprising the steps of:

receiving by said second replication appliance (N) replication commands and (N) first inodes from said first replication appliance, wherein the (j)th inode is associated with the (j)th replication command, wherein (j) is greater than or equal to 1 and less than or equal to (N);

for each value of (j), determining if the (j)th first inode was previously entered on said second replication appliance mapping;

operative if the (j)th first inode was previously entered on said second replication appliance mapping:

determining the first file associated with said (j)th first inode, the second inode associated with said (j)th first inode, and the second file associated with that second inode;

writing said (j)th first file to said (j)th second file;

operative if said (j)th first inode was not previously entered on said second replication appliance mapping:

providing a request by said second replication appliance to said first replication appliance to identify the first file associated with the (j)th first inode;

replicating by said second replication appliance said first file associated with the (j)th first inode from said first file system to said second file system as a new second file system file.

8. The method of claim 6, further comprising the steps of:

providing by said second replication appliance said second inode to said first replication appliance;

maintaining in said first replication appliance a first replication appliance mapping associating said first inode with said second inode.

9. The method of claim 6, further comprising the steps of:

maintaining in said first replication appliance a first replication appliance mapping associating said first inode with said second inode;

receiving by said first storage system a host computer command to delete said first file;

deleting said first file from said first volume;

deleting said first inode from said first file system;

removing from the association between said first inode and said second inode from said first replication appliance mapping.

10. The method of claim 9, further comprising the steps of:

deleting said second file from said second volume;

deleting said second inode from said second file system;

removing from the association between said first inode and said second inode from said second replication appliance mapping.

11. The method of claim 10, further comprising the steps of:

generating by said first metadata server a deletion command reciting said first inode;

providing said deletion command to said first replication server;

providing by said first replication server said deletion command to said second replication server;

determining by said second replication appliance the second inode associated with said first inode;

determining the second file associated with said second inode.

12. A method to provide data storage services to one or more data storage customers by a data storage services provider, comprising the steps of:

supplying a first storage system comprising a first configuration, a first file system, and a first metadata server;

supplying a first replication appliance comprising first replication appliance memory wherein said first replication appliance is external to but in communication with said first storage system;

supplying a second storage system comprising a second configuration, a second file system;

supplying a second replication appliance comprising second replication appliance memory, wherein said second replication appliance is external to but in communication with said second storage system, and wherein said first replication appliance is interconnected with said second replication appliance;

generating by said first metadata server a first inode for said dataset;

writing a dataset to said first file system as a first file;

providing said first inode to said second replication appliance;

writing said dataset to said second file system as a second file;

generating by said second replication appliance a second inode for said second file;

wherein said first configuration differs from said second configuration.

13. The method of claim 12, wherein said supplying a first storage system step further comprises supplying a first storage system comprising a first metadata server comprising memory, said method further comprising the steps of:

receiving from said customer a data storage management policy;

writing said data storage management policy to said memory;

determining by said first metadata server if said data storage management policy comprises a replication command to replicate said dataset to said second storage system;

operative if said data storage management policy comprises a replication command to replicate said dataset to said second storage system, providing said replication command to said second replication appliance;

implementing said replication command by said second replication appliance.

* * * * *